US009253383B2

(12) United States Patent
Hunt (10) Patent No.: US 9,253,383 B2
(45) Date of Patent: Feb. 2, 2016

(54) PHONE ADAPTER FOR OPTICAL DEVICES (71) Applicant: FL Archery Holdings LLC, Superior, WI (US)

(72) Inventor: Fred H. Hunt, Duluth, MN (US)

(73) Assignee: FL Archery Holdings LLC, Superior, WI (US)

( * ) Notice: Subject to any disclaimer, the term of this patent is extended or adjusted under 35 U.S.C. 154(b) by 0 days.

(21) Appl. No.: 14/334,056

(22) Filed: Jul. 17, 2014

(65) Prior Publication Data
US 2015/0042873 A1 Feb. 12, 2015

Related U.S. Application Data (60) Provisional application No. 61/863,655, filed on Aug. 8, 2013.

(51) Int. Cl.
H04N 5/225 (2006.01)
G03B 17/56 (2006.01)
G02B 23/00 (2006.01)
G03B 17/48 (2006.01)

(52) U.S. Cl.
CPC .............. *H04N 5/2254* (2013.01); *G02B 23/00* (2013.01); *G03B 17/565* (2013.01); *G03B 17/566* (2013.01); *G03B 17/48* (2013.01); *H04N 2201/0063* (2013.01)

(58) Field of Classification Search
CPC .............. H04N 5/2251; H04N 5/2254; H04N 2201/0063; H04N 5/2252; H04N 1/00246; G02B 21/362; G02B 21/0012; G02B 23/00; A61B 3/135; A61B 3/145; G03B 17/565; G03B 17/566; G03B 17/48; G06F 1/1632; H04M 1/21; H04M 1/0264
See application file for complete search history.

(56) References Cited

U.S. PATENT DOCUMENTS

| 8,073,324 | B2 * | 12/2011 | Tsai ...................... | H01F 7/0247 359/827 |
| 8,210,757 | B2 * | 7/2012 | Sterns .................... | G02B 23/16 396/419 |
| 2007/0109635 | A1 * | 5/2007 | Albrecht ................ | G02B 23/16 359/386 |
| 2012/0240444 | A1 * | 9/2012 | Russell .................. | F41C 27/00 42/90 |
| 2013/0016963 | A1 * | 1/2013 | Miller ................... | G02B 21/362 396/428 |
| 2013/0100271 | A1 * | 4/2013 | Howes .................. | H04N 5/2251 348/78 |
| 2013/0251358 | A1 * | 9/2013 | Kuehl .................... | G02B 21/36 396/428 |
| 2013/0288743 | A1 * | 10/2013 | Hunt ..................... | F41G 11/004 45/556.1 |
| 2013/0331148 | A1 * | 12/2013 | Brough ................. | G06F 1/1632 455/557 |
| 2014/0085717 | A1 * | 3/2014 | Baun ..................... | G01S 3/7867 359/429 |

(Continued)

Primary Examiner — Shahbaz Nazrul
(74) Attorney, Agent, or Firm — Covington & Burling LLP; Gregory S. Discher; Grant D. Johnson (57) ABSTRACT An adapter that optically couples a camera on a mobile device to an eye piece of an optical device. The adapter includes a base plate configured to retain the mobile device without obstructing a display screen on the mobile device. The base plate includes an optical interface configured to attach to the eye piece of the optical device. A mounting structure is configured to secure the optical interface to the eye piece of the optical device. The mounting structure includes a high friction interface that prevents rotation of the adapter relative to the eye piece. An adjustment system with threaded microadjust mechanisms is configured to move the base plate relative to the optical interface in at least two degrees of freedom to optically couple the camera on the mobile device with an optical axis of the eye piece. Images captured by the optical device are displayed on a viewing screen of the mobile device.

11 Claims, 7 Drawing Sheets

(56) References Cited

U.S. PATENT DOCUMENTS

2014/0226965 A1* 8/2014 Fujikake .............. G03B 17/566 396/544

2015/0043061 A1* 2/2015 Cho ....................... G02B 21/24 359/363

* cited by examiner

PHONE ADAPTER FOR OPTICAL DEVICES

CROSS-REFERENCE TO RELATED APPLICATIONS

This application claims the benefit of U.S. Provisional Application No. 61/863,655, filed Aug. 8, 2013, the entire disclosure of which is hereby incorporated by reference.

FIELD OF THE INVENTION

The present disclosure is directed to a mounting system that merges the photo and video functionality of a mobile device, such as a smart phone, with an optical device, such as for example, binoculars, spotting scopes, telescopes, microscopes, rifle scopes, and the like. The mounting system orients the camera lens on the mobile device so the viewing screen displays the image captured by the optical device. The photo and video capabilities of the mobile device are enhanced by the optical capabilities (e.g., magnification) of the optical device. One or more software applications can optionally be installed on the mobile device that is complementary to the use of the optical device.

BACKGROUND OF THE INVENTION

Humans use a wide variety of optical devices, such as for example, binoculars, spotting scopes, telescopes, microscopes, rifle scopes, and the like. There is a growing movement by users of such devices to record their activities using video, and then "share" their video with other people using e-mail, text messaging, or social networking sites. To date, this has been done using special purpose cameras designed as part of, or mounted to, an optical device. The user typically must take the camera home, attach it to a personal computer to download the video, edit the video, and change the format to an up-loadable format. Only then can the video be shared with other users.

U.S. Pat. Publication No. 2013/0111798 (Russell) discloses a camera mounting apparatus that includes various tubes forming an interface between the rifle scope and the smart phone. The mounting apparatus includes various clamps that provide course adjustment of the camera relative to the rifle scope. At least one embodiment requires a support for the camera mounting apparatus that is attached to the stock of the firearm.

BRIEF SUMMARY OF THE INVENTION

Mobile device technology, such as for example the Apple iPhone and Droid, contain some of the functionality found in digital video cameras, telecommunications equipment, and personal computers. This functionality includes taking still and video images, editing the images, texting the images, emailing the images and written descriptions, sharing the images and written descriptions to social networking sites such as Facebook, reviewing video and still images.

The present disclosure merges the camera functionality of a mobile device to an optical device, such as binoculars, telescopes, microscopes, gun sights, and the like. The adapter orients the camera lens on the mobile device with the optical axis of the optical device and displays the image captured by the optical device on the touch screen. The touch screen and interface of the mobile device are oriented toward, and available for use by the user, while attached to the optical device.

One embodiment is directed to an adapter that optically couples a camera on a mobile device to an eye piece of an optical device. The adapter includes a base plate configured to retain the mobile device without obstructing a display screen on the mobile device. The base plate includes an optical interface configured to attach to the eye piece of the optical device. A mounting structure is configured to secure the optical interface to a single eye piece of the optical device. The mounting structure includes a high friction interface that prevents rotation of the adapter relative to the eye piece. An adjustment system with threaded micro-adjust mechanisms is configured to move the base plate relative to the optical interface in at least two degrees of freedom to optically couple the camera on the mobile device with an optical axis of the eye piece. Images captured by the optical device are displayed on a viewing screen of the mobile device.

The at least two degrees of freedom can be two linear or one linear and one rotational. In one embodiment, the adjustment system includes at least three degrees of freedom include two linear and one rotational.

The adapter includes a base plate that safely and securely holds a variety of mobile devices. The base plate and supports leave the operating buttons, speakers, and microphones on the mobile device accessible by the user.

The present adapter allows sportsmen to use their phone to film their hunts from the "user's perspective". The adapter allows the hunter to view shot placement immediately after firing the shot. The present adapter can also be used as a training device for hunters.

One or more software applications are installed on the mobile device that is complementary to the use of the optical device. For hunters, the mobile device can be programmed to provide one or more of training, education, and coaching for the user; evaluate or enhance the user's performance; inform the user about the sport or the particular sports equipment; maintain compliance with regulatory or legal requirements for the sport; simulate game calls for hunters; provide targeting data for the shooter, such as images of game animal vital organs or sight mark generation; superimpose data and images on an actual image of the target; provide real-time data, such as scoring the user's shots, estimating the distance to the target, identifying the target species, size and weight, or estimating shot ballistics.

DETAILED DESCRIPTION OF THE INVENTION

Figure 1:
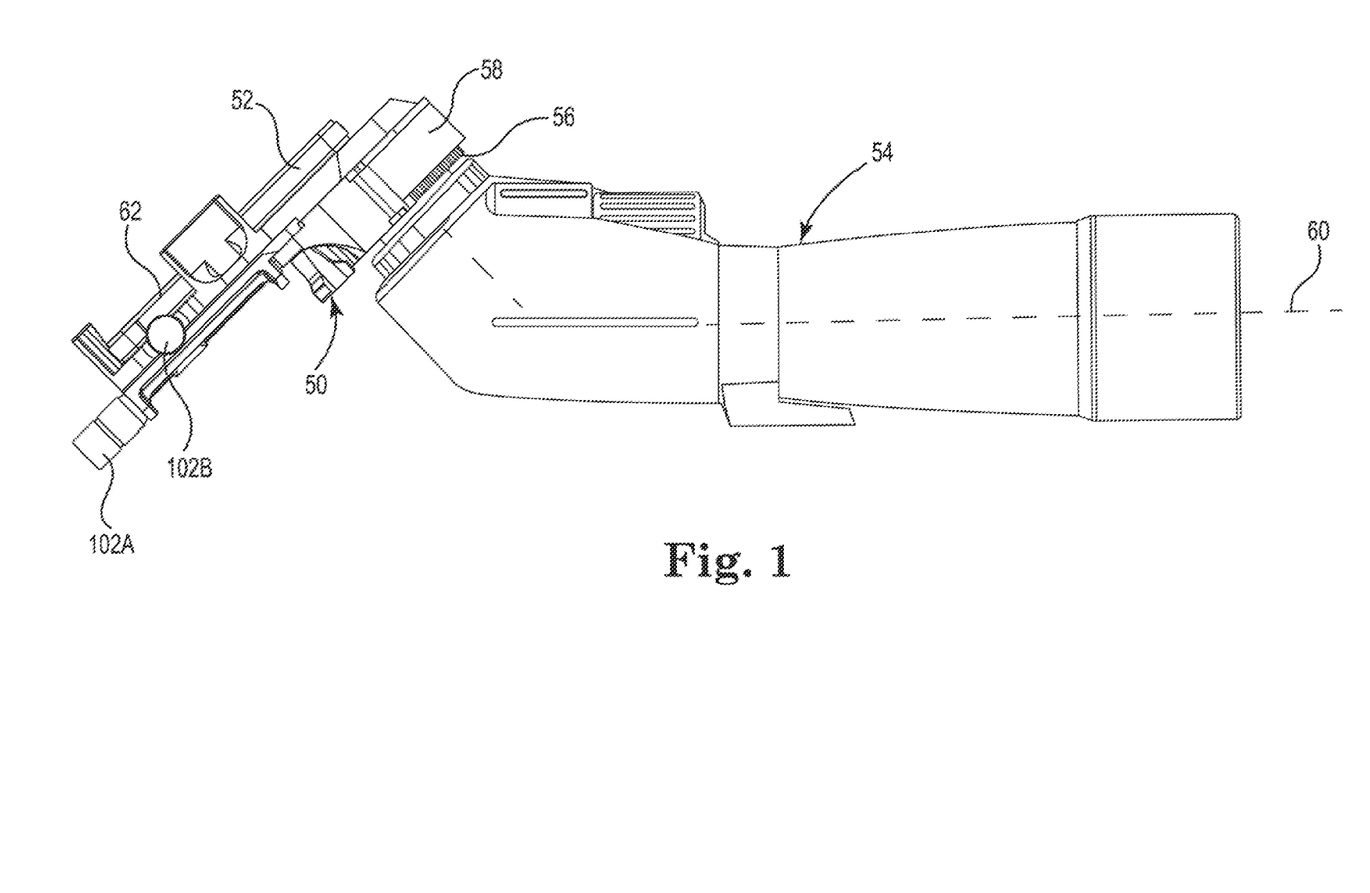
FIG. 1 is an adapter attached to an optical device in accordance with an embodiment of the present disclosure.

FIG. 1 is a perspective view of an adapter 50 that attaches a mobile device 52 to optical device 54 accordance with an embodiment of the present disclosure. As used herein, "mobile device" refers to a smart phone, cell phone, or other portable telecommunications enabled device. In the illustrated embodiment, the optical device 54 is a spotting scope, but could be a variety of other devices, such as for example, a microscope, binoculars, a telescope, a rifle sight, and the like. An exemplary optical device 54 is disclosed in U.S. Pat. No. 7,271,954 (Perger), which is hereby incorporated by reference.

In the illustrated embodiment, the adapter 50 is releasably attached to eyepiece 56 on the optical device 54 by flexible adjustable device 58, such as for example, a strap. The flexible adjustment device 58 permits the adapter 50 to be attached to eyepieces 56 of various sizes. The large surface area of engagement between the strap 58 and the eyepiece 56 reduces the risk of rotation of the adapter 50 relative to the eyepiece 56. The strap 58 preferably wraps at least 180 degrees, and more preferably at least 220 degrees, of the outer surface of the eyepiece 56. In one embodiment, the strap 58 include a high friction coating, such as rubber or silicone, to increase fixation.

The flexible strap 58 can be constructed from various woven fabrics, films, molded structures, and the like. A variety of other mounting structures can be used to attach the adapter 50 to the eyepiece of an optical device, such as for example, molded clips, adjustable compression members, suction cups, releasable adhesives, and the like.

The adaptor 50 serves to align the camera lens 100 (see FIG. 6) on the mobile device 52 with an optical axis 60 of the optical device 54. As a result, touch screen 62 on the mobile device 52 displays the image captured by the optical device 54. In the illustrated embodiment, the magnified image captured by the optical device 54 is displayed on the touch screen 62.

Figure 2:
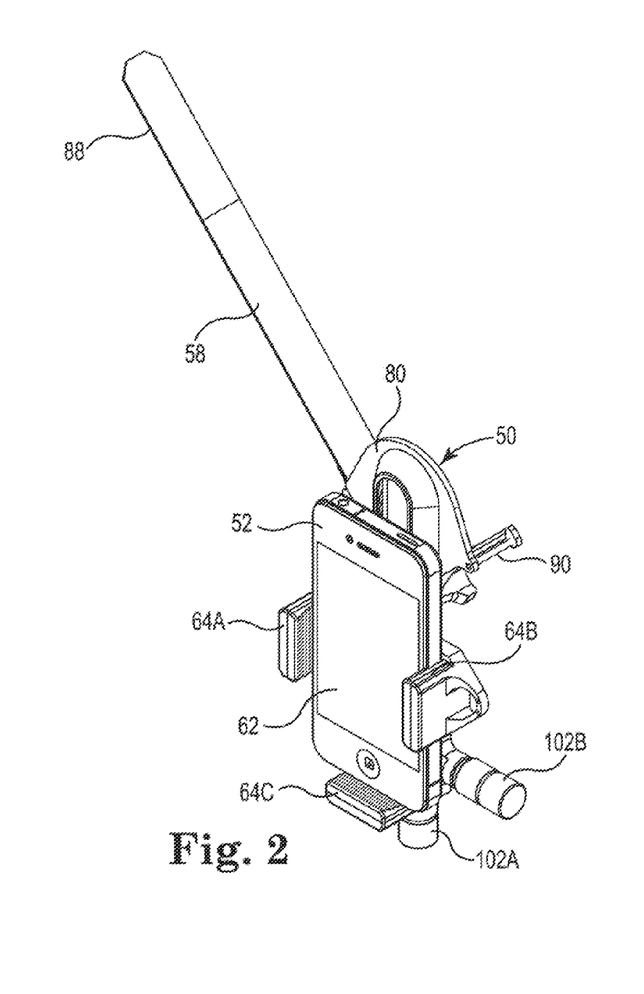
FIG. 2 is a front perspective view of a mobile device mounted to the adapter in accordance with an embodiment of the present disclosure.
Figure 3:
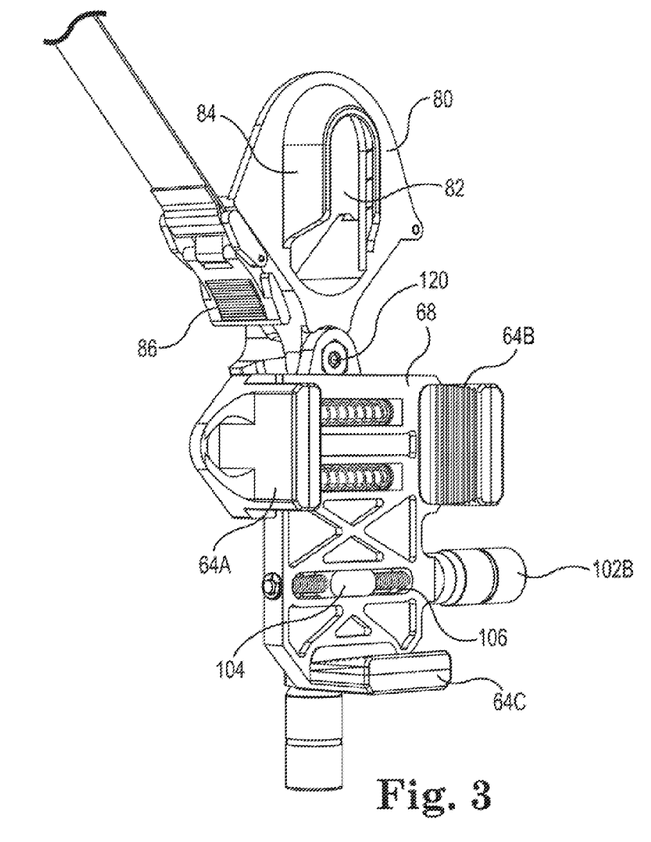
FIG. 3 is a front perspective view of the adapter of FIG. 2 with the mobile device removed.
Figure 4:
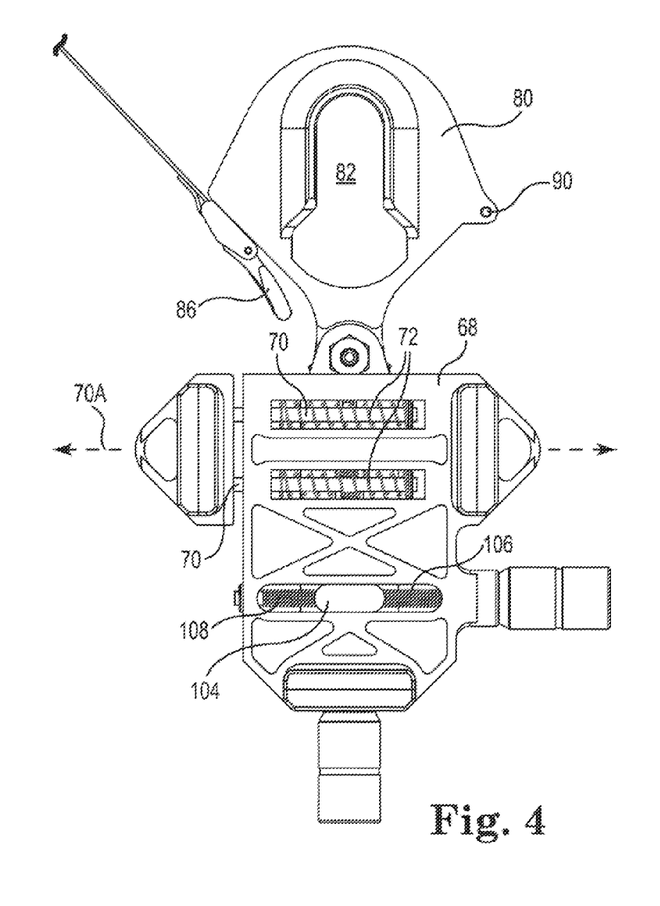
FIG. 4 is a front view of the adapter of FIG. 2 with the mobile device removed.

FIGS. 2 through 4 illustrate the adapter 50 separated from the optical device 54. Side supports 64A, 64B and bottom support 64C (collectively "64") are configured so as to not obscure the touch screen 62 or any input buttons on the mobile device 52. In the illustrated embodiment, side support 64B and bottom support 64C are fixedly attached to base plate 68. Side support 64A slides on shafts 70 along axis 70A relative to the base plate 68. Springs 72 bias the side support 64A toward the side support 64B so as to compressively engage the mobile device 52 to the base plate 68.

Optical interface 80 includes opening 82 surrounded by shroud 84 that preferably engages with rear surface of the mobile device 52. The lens 100 of the mobile device 52 is aligned with the opening 82 and the shroud 84 serves to reduce the amount of ambient light reaching the lens 100.

Latch 86 is attached to the optical interface 80 to capture distal end 88 of the flexible strap 58. In the illustrated embodiment, the flexible strap 58 wraps around the eye piece 56 of the optical device 54, around pin 90, and back to the latch 86. In the preferred embodiment, the flexible strap 58 is the sole mechanism for attaching the adapter 50 and mobile device 52 to the optical device 54.

Figure 5:
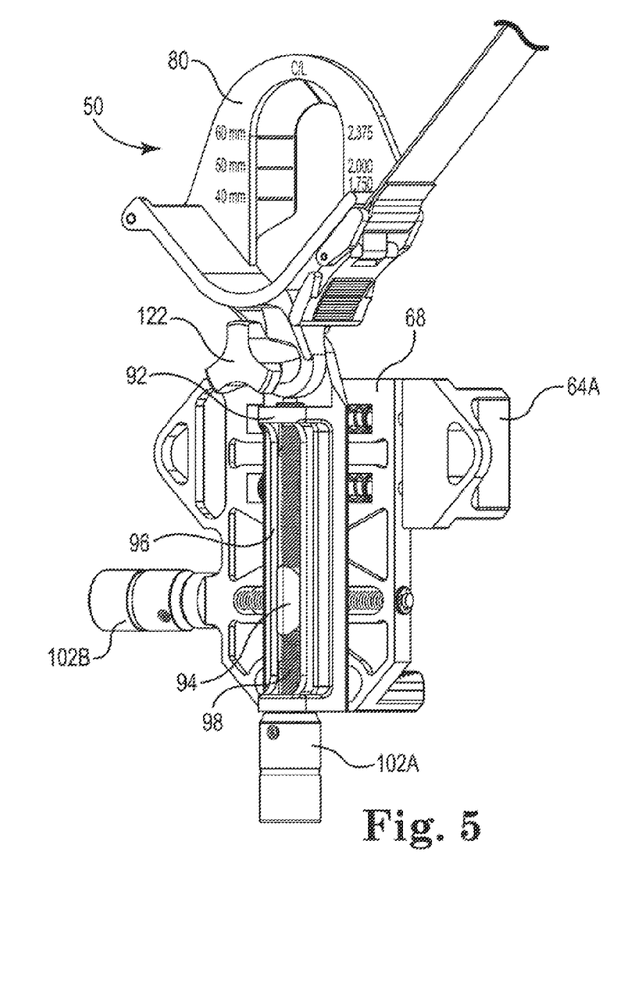
FIG. 5 is a rear perspective view of the adapter of FIG. 2 with the mobile device removed.
Figure 6:
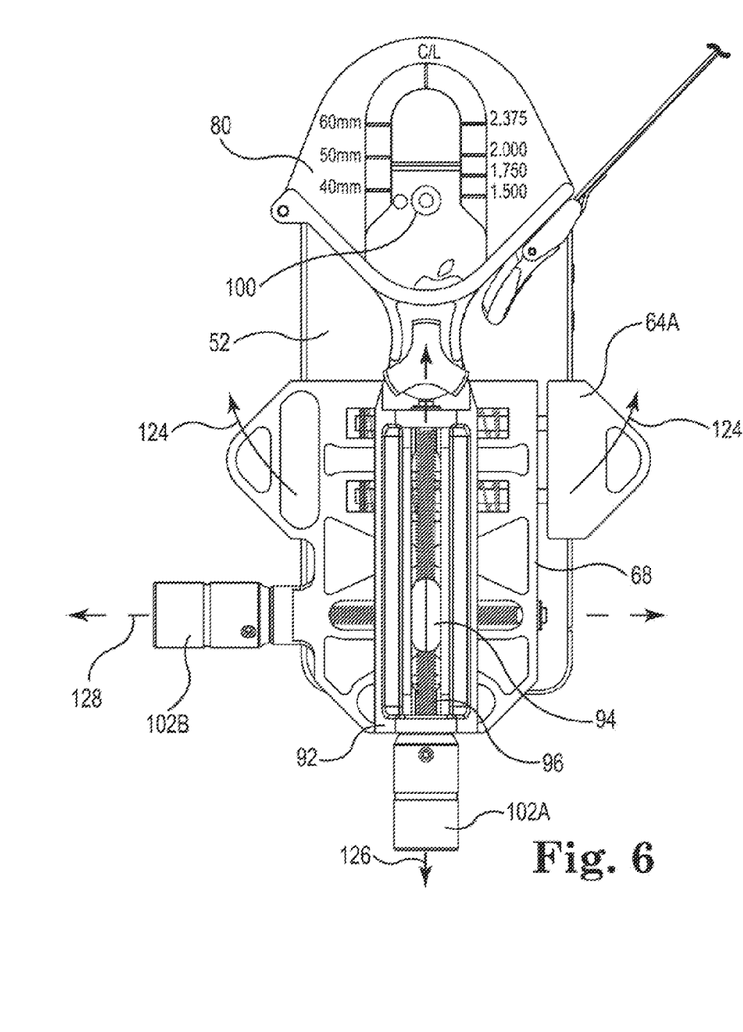
FIG. 6 is a rear view of the adapter of FIG. 2.
Figure 7:
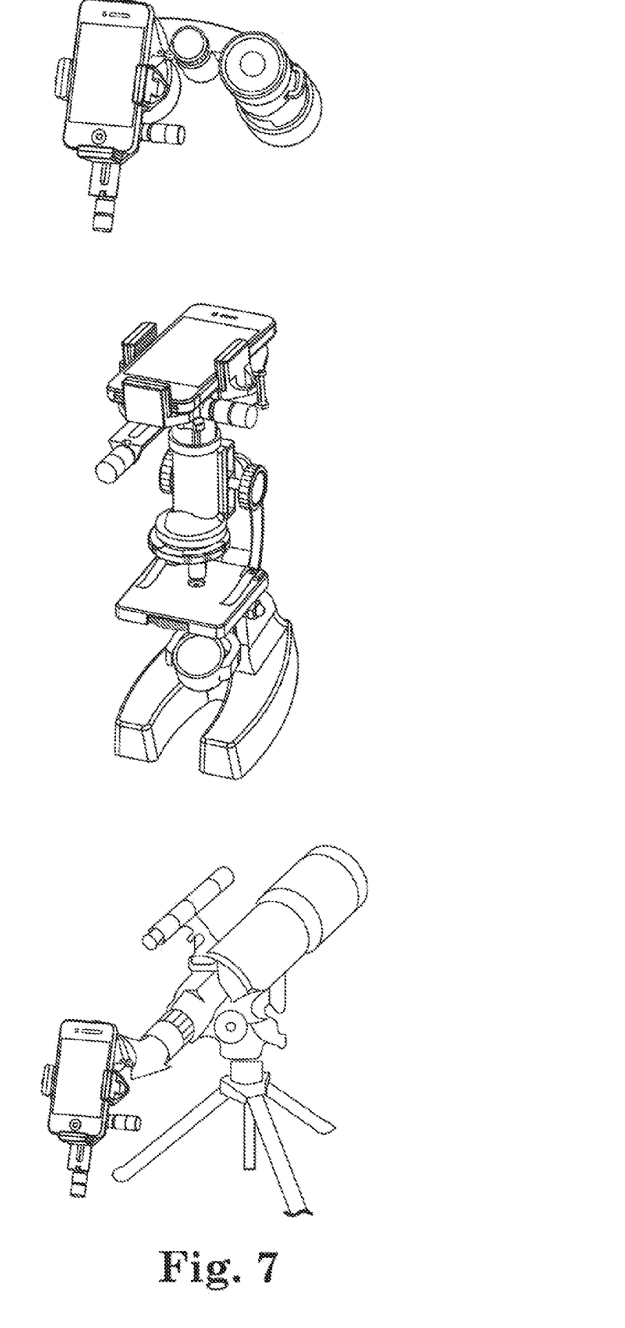
FIG. 7 is a brochure for the present adapter showing applications for telescopes and binoculars.

As best illustrated in FIGS. 5 and 6, the base plate 68 is attached to housing 92 by traveler 94. The traveler 94 rides in a slot 96 in the housing 92 along threaded member 98. Knob 102A extends beyond the adapter 50 to facilitate rotation of the threaded member 98 in order to displace the traveler 94 along axis 126.

As best illustrated in FIGS. 3 and 4, the traveler 94 includes an extension 104 that resides in slot 106 in the base plate 68. Threaded member 108 engages with the extension 104. Rotation of the knob 102B moves the base plate 68 relative to the extension 104 along the axis 128.

Turning back to FIG. 6, the housing 92 is attached to the optical interface 80 by threaded member 120. Thumb screw 122 is provided to secure the housing 92 to the optical interface 80 at the desired rotational orientation 124.

The position of the mobile device 52 relative to the optical interface 80 can be adjusted by turning the knobs 102A, 102B ("102"). Rotation of the knob 102A displaces the base plate 68 along axis 126 and rotation of the knob 102B displaces the base plate 68 along the axis 128. The threaded members 96, 98 permit micro-adjustment of the position of the lens 100 on the mobile device 52 relative to the eye piece 56 of the optical device 54, so that precise alignment is achieved.

With reference to archery and bow hunting, for example, the hunting experience can be greatly enhances by adding one of the following applications to the mobile device 52. Various applications are disclosed in commonly assigned, co-pending U.S. patent application Ser. No. 13/623,298 entitled Mounting Device for Attaching Mobile Devices to Sports Equipment, filed Sep. 20, 2012, which is hereby incorporated by reference. Similar applications are available for firearms, bird watching, astronomy, spectator sports, and the like. There are also various applications for image capture and editing, video zoom and the like that can be loaded on the mobile device 52.

Educational information—The mobile device 52 can be programmed to provide educational content for bow hunters, including shooting form and techniques, setups, gear selection, access to hunting forums and blogs, and the like. A mobile device 52 application for this purposes is sold under the trade name Realtree Archery Tips.

Range finder function—The mobile device 52 can provide a range finding function that estimates distance to the target. For example, a software application sold under the trade name Range Finder Field Helper evaluates the distance between the user and the target based on the principle of trigonometry and based on embedded sensors in the mobile device 52. Parameters can be added for any type of target or game animal.

Ballistic calculator—The mobile device 52 can be programmed to calculate ballistic parameters, such as for example, arrow speed, kinetic energy based on individual arrows, arrow balance, and the like. A software application sold under the trade name Archery Pal calculates archery ballistics. A software application sold under the trade name Mil-Dot Ballistics provides firearm range estimation based on mil-dot and real time ballistics calculations.

Game animal targeting—Hunting game animal with a bow requires knowledge of the optimum trajectory through the vital organs. The mobile device 52 can optionally display a 3D simulation of the vital organs of the target game animal is superimposed on the actual image of the animal. The mobile device 52 preferably selects the 3D simulation based on digital analysis identifying the game animal. A software application sold under the trade name Shot Simulator displays a 3D simulation of the vital organs of a deer and the desired trajectory through the deer.

Species identification—The camera in the mobile device 52 can conduct a visual review of a game animal to automatically identify species. In another embodiment, the mobile device 52 can approximate age, weight, height, inside spread of the antlers, and other characteristics of the game animal, and display any of these variables on the touch screen 62.

Scoring—The mobile device 52 can be programmed to function as an electronic score card, such as for FITA, NFAA Field and NFAA Indoor competitions. The mobile device 52 optionally analyzes the impact point of the arrow relative to the target and automatically records the score. A software application sold under the trade name Archery Score Free permits the user to create custom shots for varying distances and target size, stores past arrow placement, and the like.

Tracking shooting hours—The mobile device 52 can be programmed to automatically determine the hunter's location, applicable hunting regulations for that location, and calculate Sunrise and Sunset (and shooting hours) for various types of game. The mobile device 52 can automatically notify the user of the opening and closing of shooting hours, reducing the risk of non-compliance with local hunting laws.

Hunting regulations—Hunting regulations vary between jurisdictions. The mobile device 52 can be programmed to calculate current location using the GPS function and then display the relevant hunting regulations for the target game animal at that location. For example, a software application sold under the trade name Sportsmanregs Big Game Regulations permits the hunter to verify compliance with hunting regulation while in the field.

Shooting parameters—The mobile device 52 can be programmed to track shooting parameters for the bow, arrows, strings, and sights for future reference and analysis. For example, a software application sold under the trade name Archery Memo software keeps track of sight marks, nocking points, brace height, and arrow shaft spine.

Elapsed time and split time—Hunters, law enforcement officers, and military personnel often track elapsed time to the first shot and split time between shots to improve shooting skills. A software application sold under the trade name Sure-Fire ShotTimer displays the elapsed time and the split time for every shot fired.

Game calls—The speaker in the mobile device 52 can be used to simulate game calls. The microphone on the mobile device 52 can monitor the calls from the target animals and automatically select the desired simulated game call response. A software application sold under the trade name Primos Hunting Calls provides an interactive game calls for deer, elk, turkey, waterfowl, etc.

Linking mobile devices—The mobile devices 52 mounted in the present mounting system can be linked to another mobile device 52. For example, a software application sold under the trade name Hunting Call Remote allows the user to control a hidden mobile device 52 to transmit a remote game call.

Where a range of values is provided, it is understood that each intervening value, to the tenth of the unit of the lower limit unless the context clearly dictates otherwise, between the upper and lower limit of that range and any other stated or intervening value in that stated range is encompassed within this disclosure. The upper and lower limits of these smaller ranges which may independently be included in the smaller ranges is also encompassed within the disclosure, subject to any specifically excluded limit in the stated range. Where the stated range includes one or both of the limits, ranges excluding either both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the various methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present disclosure is not entitled to antedate such publication by virtue of prior invention. Further, the dates of publication provided may be different from the actual publication dates which may need to be independently confirmed.

Other embodiments are possible. Although the description above contains much specificity, these should not be construed as limiting the scope of the disclosure, but as merely providing illustrations of some of the presently preferred embodiments. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form varying modes disclosed. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

What is claimed:

1. An adapter that optically couples a camera on a mobile device to an eye piece of an optical device, the adapter comprising:
    a base plate configured to retain the mobile device without obstructing a display screen on the mobile device, the base plate including an optical interface configured to attach to the eye piece of the optical device;
    a mounting structure configured to secure the optical interface to a single eye piece of the optical device, the mounting structure providing a high friction interface that prevents rotation of the adapter relative to the eye piece; and
    an adjustment system with threaded micro-adjust mechanisms configured to move the base plate relative to the optical interface in at least two degrees of freedom to optically couple the camera on the mobile device with an optical axis of the eye piece;
    whereby images captured by the optical device are displayed on a viewing screen of the mobile device.

2. The adapter of claim 1 wherein the at least two degrees of freedom include one linear and one rotational.

3. The adapter of claim 1 wherein the at least two degrees of freedom include two linear.

4. The adapter of claim 1 wherein the adjustment system comprises at least three degrees of freedom include two linear and one rotational.

5. The adapter of claim 1 wherein the mounting structure comprises a flexible adjustable device.

6. The adapter of claim 1 wherein the mounting structure comprises a flexible strap that wraps around at least 180 degrees of an outer surface of the eyepiece.

7. The adapter of claim 1 wherein the micro-adjust mechanisms comprise threaded members.

8. The adapter of claim 1 wherein the base plate comprises at least one spring loaded support that compressively engages the mobile device.

9. The mounting system of claim 1 comprising one or more software applications installed on the mobile device configured to provide one or more of training, education, and coaching for the user; evaluate or enhance the user's performance; inform the user about the firearm; maintain compliance with regulatory or legal requirements; simulate game calls for hunters; provide targeting data for shooters, such as images of game animal vital organs; superimpose data and images on an actual image of the target; provide real-time firearm-specific data, such as scoring the user's shots, estimating the distance to the target, identifying the target species, size and weight, or estimating shot ballistics.

10. A method for aligning a camera on a mobile device to an eye piece of an optical device, the method comprising:

- attaching the mobile device to a base plate without obstructing a display screen on the mobile device;
- positioning an optical interface on the base plate to the eye piece of the optical device;
- securing the optical interface to a single eye piece of the optical device; and
- adjusting threaded micro-adjust mechanisms to move the base plate relative to the optical interface in at least two degrees of freedom to optically couple the camera on the mobile device with an optical axis of the eye piece; and
- displaying an image captured by the optical device on the display screen of the mobile device.

11. The method of claim 9 comprising the step of loading at least one software application to the mobile device that provides one or more of training, education, and coaching for the user; evaluate or enhance the user's performance; maintain compliance with regulatory or legal requirements; simulate game calls for hunters; superimpose data and images on an actual image of the target; scoring the user's shots, estimating the distance to the target, identifying the target species, size and weight, or estimating shot ballistics.

* * * * *